United States Patent [19]
Beacom

[11] Patent Number: 6,034,599
[45] Date of Patent: Mar. 7, 2000

[54] SIGNALLING APPARATUS FOR MOTOR VEHICLES

[76] Inventor: Josef E. Beacom, 113 W. High St., Pleasant Hill, Ohio 45359

[21] Appl. No.: 08/858,909

[22] Filed: May 19, 1997

Related U.S. Application Data

[63] Continuation-in-part of application No. 08/692,978, Aug. 7, 1996, abandoned.

[60] Provisional application No. 60/001,949, Aug. 7, 1995.

[51] Int. Cl.[7] ................................................ B60Q 1/34
[52] U.S. Cl. ...................... 340/475; 340/431; 340/463
[58] Field of Search ............................. 340/475, 431, 340/463, 465, 458, 468; 315/191, 77; 307/10.8

[56] References Cited

U.S. PATENT DOCUMENTS

| | | | |
|---|---|---|---|
| D. 351,671 | 10/1994 | Beacom | D26/35 |
| 2,975,401 | 3/1961 | Shupe | 340/84 |
| 3,474,411 | 10/1969 | Collins | 340/87 |
| 3,514,623 | 5/1970 | Ballard | 307/10 |
| 3,611,288 | 10/1971 | Little et al. | 340/81 |
| 3,848,227 | 11/1974 | Helm | 340/74 |
| 3,970,860 | 7/1976 | Purdy | 307/10 LS |
| 4,005,313 | 1/1977 | Tibbits | 307/10 R |
| 4,006,453 | 2/1977 | Bryant | 340/67 |
| 4,325,052 | 4/1982 | Koerner | 340/67 |
| 4,781,393 | 11/1988 | Jeter | 280/422 |
| 4,801,917 | 1/1989 | Winterfeld | 340/81 R |
| 4,859,982 | 8/1989 | Seaburg | 340/475 |
| 4,903,174 | 2/1990 | Busby | 362/61 |
| 5,134,385 | 7/1992 | Coleman | 340/473 |
| 5,198,798 | 3/1993 | Lietzow et al. | 340/539 |
| 5,424,715 | 6/1995 | Lietzow et al. | 340/539 |

OTHER PUBLICATIONS

American Society of Agricultural Engineers, Lighting and Marking of Agricultural Field Equipment on Highways, ANSI/ASAE S279.9, Jul. 1993 by American National Standards Institute.

*Primary Examiner*—Jeffery A. Hofsass
*Assistant Examiner*—John Tweel, Jr.
*Attorney, Agent, or Firm*—Biebel & French

[57] ABSTRACT

Signalling apparatus for retrofitting a vehicle, such as agricultural equipment, to provide safety indicators behind the vehicle, comprises a support detachably mountable behind the vehicle, caution indicators mounted by the support, a module in electrical communication with the caution indicators and an electrical coupling for receiving turn signals from the motor vehicle and communicating the turn signals to the module. The module includes first and second electrical paths leading to the caution indicators. The second electrical path communicates the turn signals from the electrical coupling to the caution indicators. A flasher is interposed in the first electrical path for supplying a flashing signal to the caution indicators. The first electrical path communicates the flashing signal to the caution indicators when all of the turn signals from the vehicle are inactive and communicates the turn signals to the caution indicators when at least one of the turn signals is active. It is one object of the invention to provide a signalling apparatus for a motor vehicle capable of quick and easy use with either a truck plug configuration or a tractor plug configuration.

11 Claims, 6 Drawing Sheets

SIGNALLING APPARATUS FOR MOTOR VEHICLES

CROSS-REFERENCE TO RELATED APPLICATIONS

This is a continuation-in-part of U.S. patent application Ser. No. 08/692,978, filed Aug. 7, 1996, now abandoned which claimed the benefit of U.S. Provisional Application No. 60/001,949, filed Aug. 7, 1995.

BACKGROUND OF THE INVENTION

1. Field of the Invention

This invention relates to the field of electrical signalling apparatus for motor vehicles, and more particularly relates to a signalling apparatus providing turn, braking and caution indicators for agricultural equipment and the like.

2. Description of the Related Art

Motor vehicles such as automobiles or trucks designed to travel over public roads are provided with lights for signalling turns and braking as standard equipment. Typically, such a motor vehicle is provided with a pair of tail or running lights, one near each of the left and right rear sides of the vehicle. These tail lights each include a pair of filaments to permit the running lights to burn at two different intensities. During normal operation, low intensity filaments in the tail lights are energized to indicate the size and position of the vehicle. When the brake pedal is pressed, a brake signal activates high intensity filaments in the tail lights so that the tail lights burn more brightly than when no brake signal is active.

Many vehicles designed to travel over public roads also mount a separate pair of rear turn signal lights (along with a corresponding pair of front turn signal lights), which are positioned near the left and right running lights, respectively. During normal operation, these turn signal lights are dark. The driver signals an intention to make a turn by flashing the turn signal light on the side toward which the driver intends to turn while leaving the other turn signal light dark.

Alternatively, the tail lights of many pickup trucks and other vehicles have dual filaments. Such vehicles signal turns by flashing a high intensity filament in the tail light on the side toward which the driver intends to turn.

American Society of Agricultural Engineers ["ASAE"] standards recommend that slow-moving agricultural equipment have at least two headlamps, at least one red tail lamp and at least two amber flashing warning lamps. Furthermore, it is recommended that such equipment mount passive "slow moving vehicle" emblems as well as reflectors positioned to indicate the width of the equipment.

According to one signalling scheme, one or more red tail lights are used for the position and braking indications, while a pair of amber caution lights are used for the caution and turn indications. When the agricultural equipment is traveling below a predetermined speed (for example, twenty-five miles-per-hour), both caution lights are flashed intermittently. When it is desired to turn, the caution light on the side toward which the equipment is turning continues to flash intermittently, while the caution light on the side opposite the turn goes dark. According to one alternative, braking or a turn is indicated by means of the red tail lights alone, with the caution lights going dark when either braking or a turn is signalled.

According to another alternative, a turn is indicated by flashing the caution light on the side toward which the equipment is turning intermittently while burning the caution light on the side opposite the turn continuously. One disadvantage to this alternative signalling scheme is the risk that a motorist unfamiliar with the ASAE standards will attribute some unwarranted significance to the continuously-burning caution light opposite the direction of turn.

Many automobiles and trucks provide a "hazard" indication, in which the headlights, tail lights and turn signal lights (where present) are all flashed simultaneously. This hazard indication is not a suitable substitute for the combination of tail lights and caution lights discussed above, since it is impractical for a driver of an automobile or truck to indicate a turn while the hazard indication is operating. It should also be noted that it is illegal in some jurisdictions for a truck to operate on a highway with its hazard signals flashing.

Even where a towing vehicle is provided with tail lights, rear turn lights and caution lights, these may be obscured if the towing vehicle is used to tow another large vehicle. Thus, it is common practice for newer motor vehicles to include plugs for connecting lights mounted on the towed vehicle to one or more of the tail, brake, turn and caution signals of the towing vehicle. Different vehicles have different plug configurations for making such connections.

One plug configuration, common in pickup trucks, includes four contacts, one for ground, one for the tail signal, and two which carry both the brake signal and the turn signals. The latter two contacts are inactive when the brake and turn signals are both off. When the brake pedal is pressed and no turn is being signalled, both of the latter two contacts supply a steady signal. When a right or left turn is being signalled without the brake pedal being pressed, one of the latter two contacts supplies an intermittent flashing signal while the other is inactive. When a turn is intended and the brake pedal is being pressed, one of the latter two contacts supplies a flashing signal while the other supplies a steady signal. None of the contacts in this configuration supplies a caution indication.

Another plug configuration, common in farm tractors and other agricultural equipment, includes four contacts, one for ground, one for the tail signal and two which carry both the turn signals and a caution indication signal. If the vehicle is running but no turn is being indicated, the latter two contacts each supply an intermittent flashing signal to provide a caution indication. When a right or left turn is to be signalled, a corresponding one of the latter two contacts supplies the flashing signal while the other supplies no signal. This configuration does not supply a brake signal.

For convenience, this specification will refer to the signals conducted by either the truck or tractor plug configurations as "ground," "tail" and "turn" signals. Note that the turn signals described in connection with the truck or tractor plugs may combine turn and braking indications, as in the truck plug configuration, or turn and caution indications, as in the tractor plug configuration.

While tail lights, turn lights and caution lights are currently standard equipment on farm tractors, this has not always been the case. Many tractors still in service were manufactured before tail lights, turn lights and caution lights became standard equipment. On occasion, one still sees a farm tractor operated on a public road with only reflectors to indicate its size, position and speed.

There remains a need for a signalling apparatus which is quickly and easily coupleable to either a truck or tractor plug configuration to provide standard tail, brake, turn and caution indications for self-propelled or towed agricultural equipment. In addition, there remains a need for a signalling apparatus capable of providing intermittent caution indicators when the equipment is moving below a minimum speed and de-activating the intermittent caution indicators when the vehicle is operated at higher speed.

U.S. Pat. No. 4,006,453 to Bryant proposes a device for adapting combined brake and turn signal lights on a trailer to independent brake signal and turn signal lights on a towing vehicle. The device has two circuits, one for each side, each circuit having a brake signal switch. The brake signal switches are selectively actuated by impulses received from the corresponding turn signal flashers on the vehicle, to block the brake signal current to the corresponding signal light on the trailer. Bryant does not address the problem of generating a flashing signal to two or more caution indicators on the rear of an agricultural vehicle when neither braking nor a turn is being indicated; instead, Bryant appears to address the separate problem of independently interrupting a constant braking signal, on one side of the vehicle only, when the driver signals a turn.

SUMMARY OF THE INVENTION

These needs are addressed by means of signalling apparatus for retrofitting a vehicle, such as agricultural equipment, to provide safety indicators behind the vehicle. In preferred form, the apparatus comprises a support detachably mountable behind the vehicle, caution indicators mounted by the support, a module in electrical communication with the caution indicators and an electrical coupling for receiving turn signals from the motor vehicle and communicating the turn signals to the module.

The module includes first and second electrical paths leading to the caution indicators. The second electrical path communicates the turn signals from the electrical coupling to the caution indicators. A flasher is interposed in the first electrical path for supplying a flashing signal to the caution indicators. The first electrical path communicates the flashing signal to the caution indicators when all of the turn signals from the vehicle are inactive and communicates the turn signals to the caution indicators when at least one of the turn signals is active.

In an especially preferred form, at least one switch is provided to select communication through either the first or second electrical path. When the preferred signalling apparatus is used with a pickup truck or another vehicle having a plug configuration which does not supply an intermittent flashing signal to provide a caution indication, the caution indicator is preferably coupled to the first electrical path to receive the flashing signal from the flasher when the turn signals are inactive. When no caution indication is desired or when the preferred signalling apparatus is used with agricultural equipment or another vehicle having a plug configuration which supplies turn signals themselves capable of flashing the caution indicators to indicate slow movement, the caution indicators are preferably coupled to the second electrical path.

The support preferably includes a pair of brackets and the caution indicators are a pair of electric lamps in at least partially amber-colored housings. Each bracket mounts one of the lamps. In an especially preferred form, the brackets are coupled to the rear of the agricultural equipment by means of either bolts or magnets.

One preferred means for defining the first and second electrical paths includes first and second switches, each of which has first and second switching states. The caution indicator is electrically coupled to the flasher when both switches are in their first switching states, and the caution indicator is isolated from the flasher when one of the switches is in its second switching state. Nonetheless, it is within the spirit and scope of the invention to define the first and second electrical paths by means of plug-in modules or interchangeable circuits exchangeable to permit the signalling apparatus to interpret signals from either truck or tractor plug configurations.

In an especially preferred form, the first switch is a relay having a coil responsive to the brake/turn signals provided by a plug having a truck configuration, while the second switch is a manually-actuated mechanical switch such as a toggle switch. Relays are preferred over semiconductor switches in this application due to their greater durability and temperature range. In this form, the second switch acts as a truck/tractor selection switch enabling a single signalling apparatus to interpret signals from either a truck plug configuration or a tractor plug configuration without being rewired. While the preferred embodiment will be described in terms of relays and toggle switches, it is within the spirit and scope of the invention to use alternative means, such as semiconductor circuit elements, for defining the first and second electrical paths in the signalling apparatus of the invention.

In use, when the apparatus is coupled to a plug having a tractor configuration and the truck/tractor selection switch (that is, the second switch) is in the tractor (second) state, the right and left caution indicators (e.g., turn signal lights) are directly controlled by the signals from the right and left turn signal contacts, which provide both caution and turn indications to the right and left caution indicators. When the apparatus is coupled to a plug having a truck configuration and the truck/tractor selection switch is in the truck (first) state, the right and left caution indicators are electrically coupled to the flasher of the apparatus and flash a caution indication in the absence of a brake/turn signal. When the right or left turn signal contacts conduct a brake/turn signal, the flasher is isolated from the caution indicators and the caution indicators are controlled by the signals supplied through the turn signal contacts.

In other words, the preferred signalling apparatus energizes the right caution indicator when one of the following conditions occurs:

1) when power is received from a right turn contact of the vehicle plug; or
2) when the truck/tractor selection switch (that is, the second switch) is in the "truck" (first) switching state, no power is received from a left turn signal contact of the motor vehicle plug and power is received from the flasher.

Similarly, the left caution indicator (that is, ordinarily, the left turn light) is energized when one of the following conditions occurs:

1) when power is received from the left turn contact of the motor vehicle plug; or
2) when the truck/tractor selection switch (that is, the second switch) is in the "truck" (first) switching state, no power is received from the right turn signal contact of the motor vehicle plug and power is received from the flasher.

In another preferred form, the signalling apparatus includes a running or tail indicator mounted by the support having a first enabled state (e.g., low intensity) responsive to a tail signal from the motor vehicle and a second enabled (e.g., high intensity) state. In an especially preferred form, the tail indicator includes a pair of electric lamps in at least partially red-colored housings, each of the pair of electric lamps having low- and high-intensity filaments. The preferred support includes a pair of brakets, each bracket mounting one of the lamps in the at least partially red-colored housings adjacent to one of the caution indicators.

When the apparatus is used with a motor vehicle having a truck plug configuration, the brake signal is carried through the turn signal contacts. On the other hand, when the apparatus is used with a tractor plug configuration, the brake signal must be introduced separately. According to an especially preferred form, the signalling apparatus is adapted to activate the second enabled state of a right tail indicator (e.g., the high-intensity state of a right running light) whenever power is received through a right turn signal contact of the vehicle plug. Alternatively, the especially preferred signalling apparatus is adapted to activate the second enabled state of a left tail indicator whenever power is received through a left turn signal contact of the vehicle plug.

According to one preferred embodiment particularly useful in connection with a farm tractor lacking inherent braking signals, the signalling apparatus includes a limit switch which is engaged with a brake pedal of the farm tractor, as by positioning the limit switch between the brake pedal and a firewall, to generate the brake signal when the brake pedal is pressed. Alternatively, the brake signal is controlled by a manually-actuated switch which the driver actuates at the same time that he presses the brake. In either of these embodiments, the signalling apparatus is adapted to activate the second enabled states of a right and left tail indicators (e.g., the high-intensity states of the tail lights) whenever a brake signal is received from the limit switch.

In another preferred form, the apparatus includes a control box positioned remotely from the support. This control box includes an intermittent signal generator and a turn signal control switch having first, second and third control states. In the first control state of the turn signal control switch, the intermittent signal generator is electrically coupled with a first (e.g., left) caution light and isolated from a second (e.g., right) caution light. In the second control state, the intermittent signal generator is electrically coupled the second caution light and is isolated from the first caution light. Thus, the first and second control states correspond to left and right turn signals. In the third control state of the turn signal control switch, the intermittent signal generator is electrically coupled to the first and second caution lights. Thus, the third control state corresponds to a caution indication. In this manner, the control box is capable of providing signals analogous to those provided through the left and right turn signal contacts of a tractor plug.

In an especially preferred form, the control box includes a power supply for the intermittent signal generator and a caution light switch for de-energizing the intermittent signal generator when neither caution lights nor turn signals are desired. In addition, the especially preferred control box includes a limit switch engaged with a brake pedal of the motor vehicle. The limit switch is adapted to interrupt the power supply to the intermittent signal generator when the brake pedal is pressed, so that the caution indication is discontinued when the brake pedal is pressed.

Accordingly, it is one object of the invention to provide a signalling apparatus for a motor vehicle capable of quick and easy connection to either a truck plug configuration or a tractor plug configuration. This and other objects, features and advantages of the present invention will be described in further detail in connection with the preferred embodiments of the invention shown in the accompanying drawings.

DETAILED DESCRIPTION OF THE PREFERRED EMBODIMENT

Figure 1:
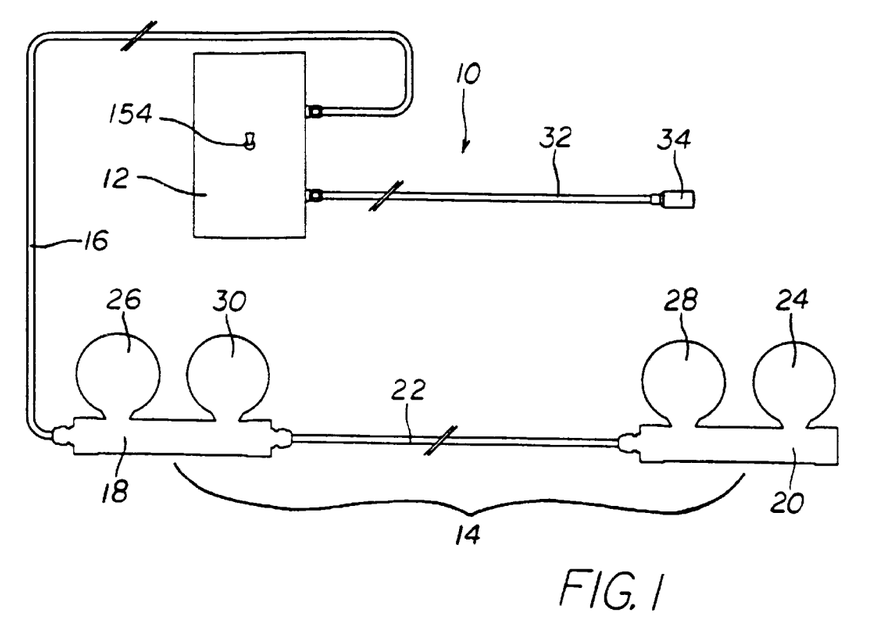
FIG. 1 is a schematic view showing a first embodiment of the signalling apparatus of the present invention.

FIG. 1 is a schematic view showing a signalling apparatus 10 comprising a switching box or module 12 electrically coupled to a support 14 by means of a first multiconductor cable 16. The support 14 includes a pair of frames or brackets 18, 20 electrically coupled with each other by a second multiconductor cable 22. The frames 18, 20 mount caution indicators or lights 24, 26 and running indicators 28, 30. A third multiconductor cable 32 terminating in a female coupling 34 extends from the switching box for receiving turn, braking and caution signals from a motor vehicle plug (not shown).

Figure 2:
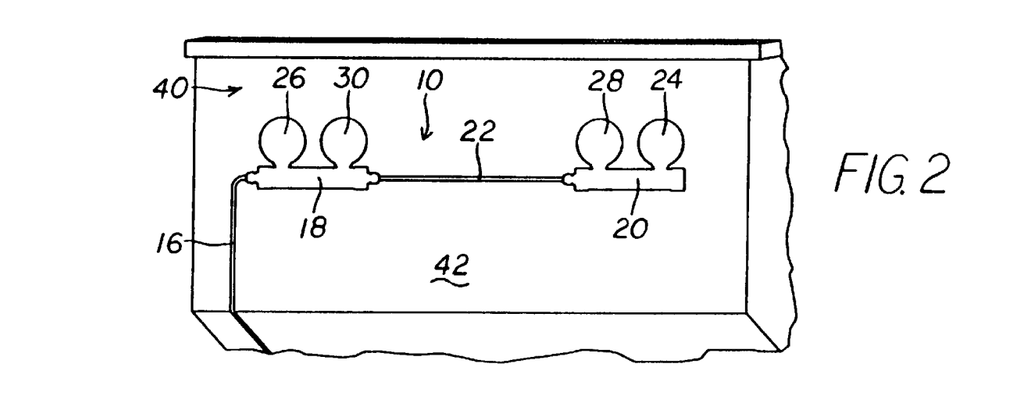
FIG. 2 is a schematic view showing the embodiment of FIG. 1 installed on agricultural equipment.

FIG. 2 is a schematic view showing the signalling apparatus 10 installed on agricultural equipment 40. The agricultural equipment 40 may be either self-propelled or pulled by a towing vehicle (not shown). The frames 18, 20 are positioned on a rear portion 42 of the agricultural equipment 40 so that the caution lights 24, 26 and the running lights 28, 30 are visible behind the agriculatural equipment 40 (as well as behind any towing vehicle). The female coupling 34 (FIG. 1) electrically engages a vehicle plug (not shown) extending from the agricultural equipment 40 (or, if the agricultural equipment 40 is towed, from the towing vehicle) to conduct the turn, caution and braking signals to the switching box 12. The first multiconductor cable 16 conducts signals from the switching box 12 to the frame 18, while the second multi-conductor cable 22 conducts such signals from the frame 18 to the frame 20. The switching box 12 itself is preferably positioned on the underside of the agricultural equipment 40 (or, if the agricultural equipment 40 is towed, on the underside of the towing vehicle).

Figure 3:
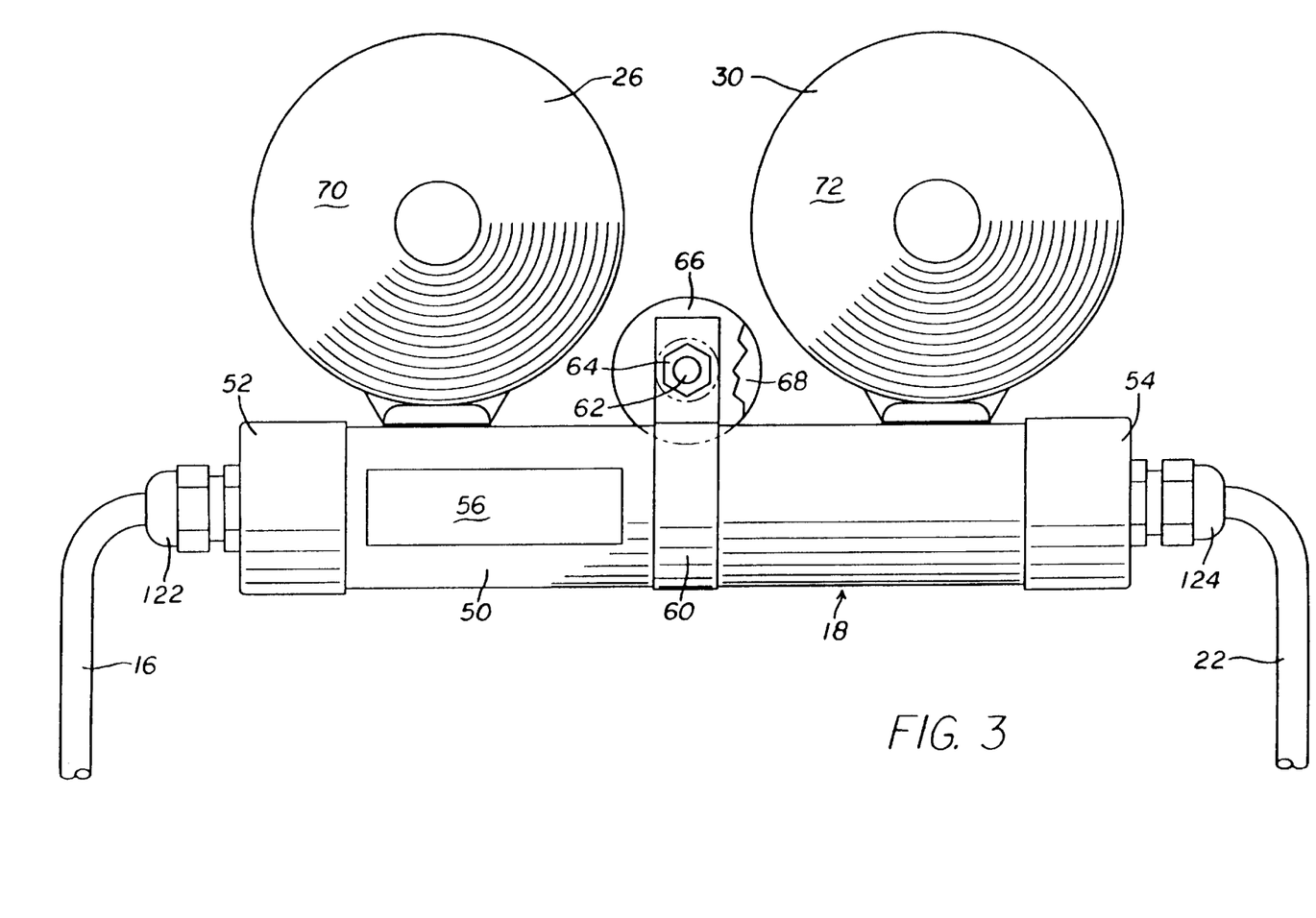
FIG. 3 is an elevational view of a frame or bracket mounting indicators for use in the embodiment of FIG. 1.

A left frame 18 with caution light 26 and running light 30 is shown in elevation in FIG. 3. (The right frame 20 is approximately a mirror image of the left frame 18.) The frame 18 includes a generally tubular plastic body 50 with plastic end caps 52, 54 at either end. Apart from the lights 26, 30, the generally tubular body 50 mounts a reflector 56 which cooperates to indicate the size of the agricultural equipment 40 or other vehicle (not shown) on which it is mounted to following motorists. A clamp 60 secured by a bolt 62 and nut 64 embraces the generally tubular body 50 near its axial center plane. In an especially preferred embodiment, the bolt 62 mounts a ring 66 which, in turn, mounts a ring magnet 68. The frame 18 is secured to the rear area 42 (FIG. 2) of the agricaluatural equipment 40 (FIG. 2) or other vehicle (not shown) either permanently by means of the bolt 62 or temporarily by means of the ring magnet 68.

The clamp 60 may be loosened and rotated about the generally tubular body 50 so that the frame 18 may be mounted in different orientations.

Figure 4:
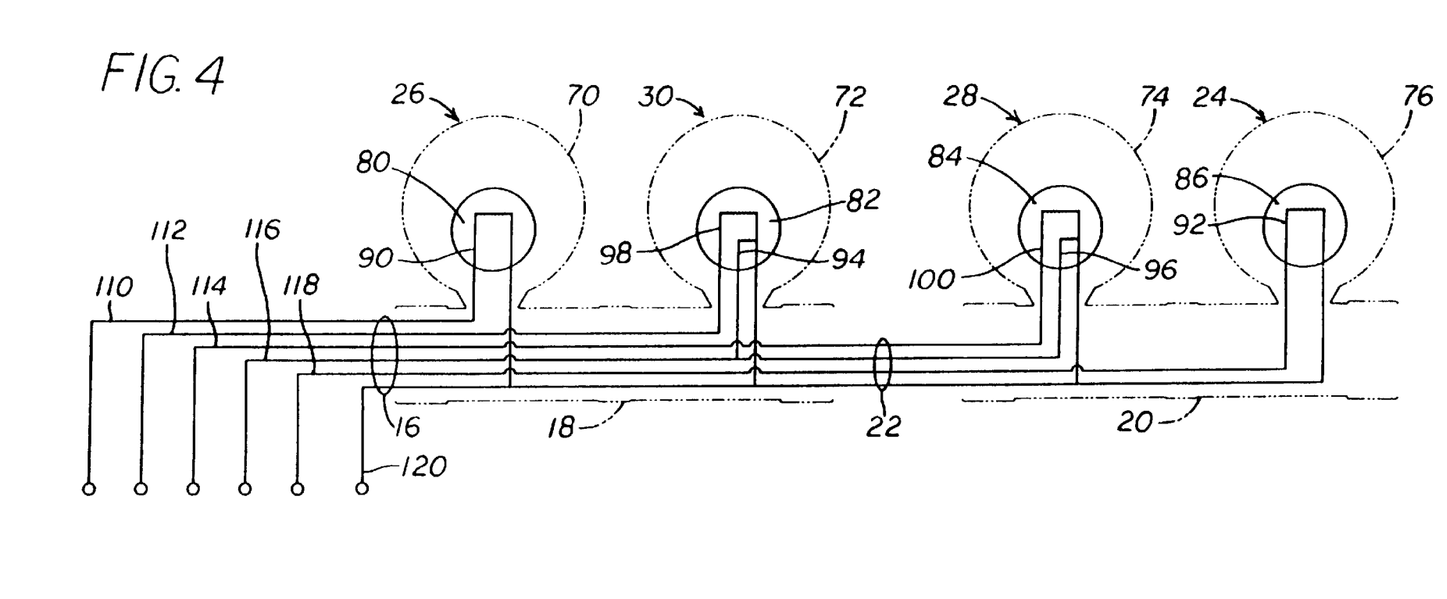
FIG. 4 is a schematic view of a wiring scheme for the indicators of FIG. 3.

As best shown in FIG. 4, the left caution light 26 comprises a transparent colored plastic housing 70 surrounding an electric lamp 80. The left running light 30 comprises a transparent colored plastic housing 72 surrounding an electric lamp 82. The right running light 28 comprises a transparent colored plastic housing 74 surrounding an electric lamp 84. The right caution light 24 comprises a transparent colored plastic housing 76 surrounding an electric lamp 86.

The plastic housings 70, 76 for the caution lights 24, 26 are preferably amber-colored in front and back, while the housings 72, 74 for the running lights 28, 30 are preferably red in the rear facing away from the agricultural equipment 40 (FIG. 2) or other vehicle (not shown) when installed and amber or opaque facing front. As best shown in FIG. 4, the lamps 80, 86 of the caution lights 24, 26 each have a single filament 90, 92 while the lamps 82, 84 of the running lights 28, 30 each have a low intensity filament section 94, 96 and a high intensity filament section 98, 100.

The first multiconductor cable 16 includes six conductors 110, 112, 114, 116, 118 and 120. These six conductors 110, 112, 114, 116, 118, 120 supply the following signals from the switching box 12: conductor 110, left caution/turn signal; conductor 112, left brake signal; conductor 114, right brake signal; conductor 116, tail signal; conductor 118, right caution/turn signal; conductor 120, ground. (The terms "left and right brake signal" are used to refer to the signals which selectively illuminate the high intensity filament sections 98, 100 of the lamps 82, 84. Depending on the configuration of the vehicle plug (not shown) and of the switching box 12, these signals conduct not only braking indications but also turn or other indications as well.)

All six conductors 110, 112, 114, 116, 118, 120 enter the generally tubular body 50 of the left frame 18 through a nipple 122 (FIG. 3). The left caution/turn signal conductor 110 and the ground conductor 120 are coupled to opposite leads of the filament 90 of the left caution light 26, while the left brake signal conductor 112, the tail signal conductor 116 and the ground conductor 120 are coupled to leads of the filaments 94, 98 of the left running light 30. The conductors 110, 112 terminate in the left frame 18, while the remaining conductors 114, 116, 118 and 120 exit the left frame through a nipple 124 (FIG. 3) and continue through the second multiconductor cable 22 to the right frame 20.

The second multiconductor cable 22 couples the left and right frames and is preferably sufficiently long so that the right and left frames 18, 20 may be positioned near the right and left sides of the rear area 42 of the agricultural equipment 40 (FIG. 2) or other vehicle (not shown).

In the right frame 20, the right brake signal conductor 114, the tail signal conductor 116 and the ground conductor 120 are coupled to the filaments 96, 100 of the right running light 28, while the right caution/turn signal conductor 118 and the ground conductor 120 are coupled to the filament 92 of the right caution light 24. The four conductors 114, 116, 118 and 120 each terminate in the right frame 20. While the switching box 12 and the first frame 18 have been shown electrically coupled by a first multiconductor cable 16 and the right and left frames 18, 20 have been shown coupled by a second multiconductor cable 16, alternative wiring schemes, such as a pair of multiconductor cables directly coupling both the right and left frame 18, 20 to the switching box 12, are within the scope and spirit of the invention.

Figure 5A:
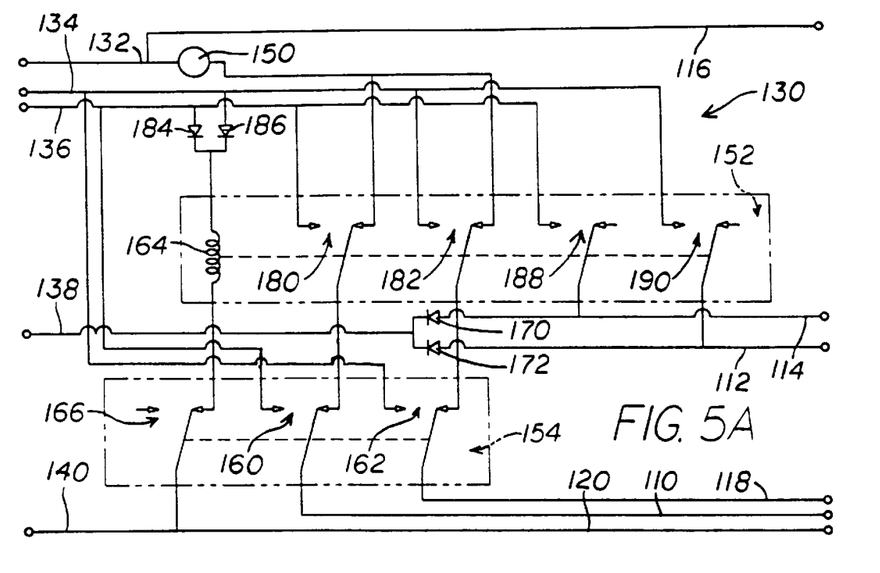
FIG. 5A is a schematic diagram showing a first switching circuit for the embodiment of FIG. 1.

FIG. 5A is a schematic diagram of a first switching circuit 130 housed in the switching box 12 which permits a driver (not shown) to adapt the signalling apparatus 10 for either truck or tractor plug configurations without rewiring the apparatus 10. The first switching circuit 130 has five inputs: a tail signal input 132, a left turn signal input 134, a right turn signal input 136, a brake signal input 138 and a ground input 140. The tail signal input 132, the left and right turn signal inputs 134, 136 and the ground input 140 are preferably coupled to corresponding contacts (not shown) of the female coupling 34 (FIG. 1).

The first switching circuit 130 has six outputs corresponding to the six conductors of the first multiconductor cable 16 (FIG. 4). The tail signal input 132 and the ground input 140 are coupled directly to the tail signal conductor 116 and the ground conductor 120 of the first multiconductor cable 16.

The first switching circuit 130 includes three major components: a flasher 150, a first four pole-double throw magnetic relay switch 152 and a second three pole-double throw toggle switch 154. The flasher 150, which is preferably a mechanical flasher, receives power from the tail light input 132 and generates an intermittent flashing signal capable of serving as a caution signal to the left and right caution/turn signal lights 24, 26 (FIG. 4). The second switch 154 acts as a truck/tractor selection switch. When the second switch 154 is in the state shown in FIG. 5A (that is, in a first switching state), the first switching circuit 130 is adapted for a truck plug configuration; when the second switch 154 is in the opposite switching state (that is, in a second switching state), the first switching circuit 130 is adapted for a tractor plug configuration. In an especially preferred form, the second switch 154 includes a third switching state, intermediate between the truck and tractor states, in which the left and right caution/turn signal conductors 118, 110 are isolated from the remainder of the first switching circuit 130.

When the second switch 154 is in its tractor (second) state, the left and right turn signal inputs 134, 136 communicate along a second electrical path through switch components 160, 162 of the second switch 154 with the left and right caution/turn signal conductors 110, 118 of the first multiconductor cable 16 (FIG. 4). The flasher 150 and the first switch 152 are both isolated from the left and right caution/turn signal conductors 110, 118 and from the left and right caution lights 24, 26. Furthermore, when the second switch 154 is in its tractor (second) state, the path of the relay coil 164 of the first switch 152 to the ground input 140 is interrupted by a switch component 166 of the second switch 154, so that the first switch 152 cannot close while the second switch 154 is in the tractor (second) state. The turn signal inputs (not shown) in a tractor plug configuration carry both turn and caution signals, and these turn and caution signals are conducted directly to the caution lights 24, 26 without modification by the switching circuit 130 when the second switch is in the tractor (second) state.

Since a tractor plug configuration does not carry a brake signal, the switch component 166 of the toggle switch 154 interrupts the path through the relay coil 164 to the ground input 140 when the second switch 154 is in the tractor (second) state in order to isolate the brake signal conductors 112, 114 from the signals received from the turn signal inputs 134, 136.

In an especially preferred form, a limit switch (not shown) is interposed between a power supply (not shown) and the brake input 138. This limit switch is positioned between the brake pedal (not shown) and firewall (not shown) of the vehicle (not shown) so that the limit switch is closed to generate a brake signal when the brake pedal is pressed. This brake signal is conducted through the brake input 138, divided, and sent through a pair of rectifiers 170, 172 directly to the left and right brake signal conductors 112, 114.

On the other hand, the truck plug configuration does not supply a caution signal. When the second switch 154 is in its truck state, the armatures of first and second switch components 180, 182 of the first switch 152 communicate directly with the left and right caution/turn signal conductors 110, 118. When the first switch is in a first switching state (shown in FIG. 5A) and the second switch 154 is in a truck (first) switching state, the intermittent flashing signal generated by the flasher 150 communicates through a first electrical path with the left and right caution lights 24, 26. The first electrical path passes through normally closed poles of the switch components 180, 182 of the first switch 152 and through the switch components 160, 162 of the second switch 154. In these switching states, the intermittent signal from the flasher 150 induces the caution lights 24, 26 to flash a caution indication.

When an active turn signal (indicating braking or a turn) is received through the turn signal inputs 134, 136, the caution indication is interrupted. The turn signal signal passes through rectifiers 184, 186 and energizes the relay coil 164, thereby changing the first switch 152 to a second switching state. When the first switch 152 changes to its second switching state, the switching components 180, 182 isolate the flasher 150 from the left and right caution/turn signal conductors 110, 118. The rectifiers 184, 186 serve to isolate each of the left and right turn signal inputs 134, 136 from the signals conducted by the other. Instead, since the signals from the left and right turn signal inputs 134, 136 energize the relay coil 164, the signals communicate directly with the right and left caution/turn signal conductors 110, 118 through the normally open poles of switching elements 180, 182.

Since the turn signal inputs in the truck plug configuration also indicate braking, the turn signal inputs 134, 136 are coupled to normally open poles of switching components 188, 190 of the relay switch 152 for communication with the left and right brake signal conductors 112, 114 when the second switch 154 is in the truck (first) state. Since the turn signal inputs 134, 136 are coupled to the relay coil 164, one of the left and right brake signal conductors 112, 114 supplies an active signal whenever the left or right turn signal input 134, 136 is energized and the second switch 154 is in the truck state. The rectifiers 170, 172 serve to protect each of the left and right turn signal inputs 134, 136 from the signal conducted by the other.

Figure 5B:
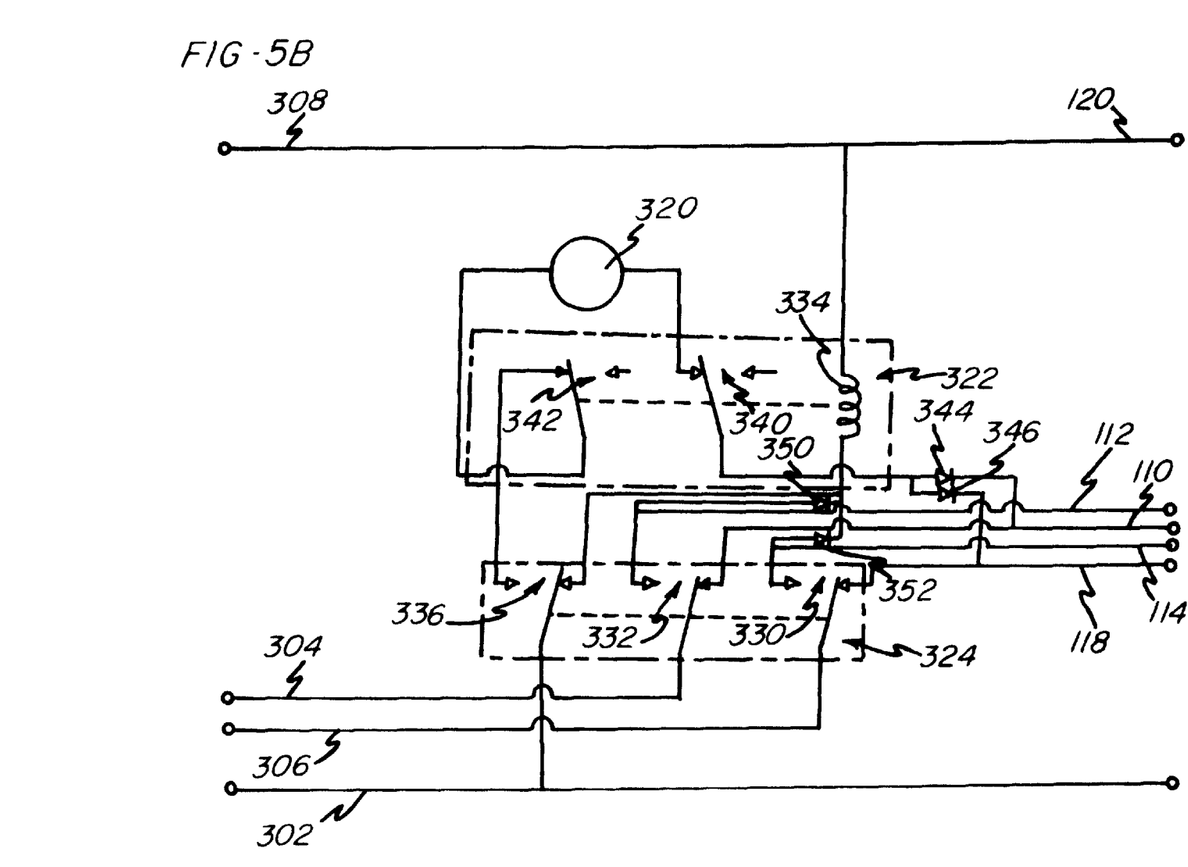
FIG. 5B is a schematic diagram showing a second switching circuit for the embodiment of FIG. 1.

FIG. 5B is a schematic diagram of a second switching circuit 300 which likewise permits a driver (not shown) to adapt the signalling apparatus 10 for either truck or tractor plug configurations without rewiring the apparatus 10. The second switching circuit 5B is housed in the switching box 12. It has four inputs: a tail signal input 302, a left turn signal input 304, a right turn signal input 306, and a ground input 308. (A brake signal input, not shown, may be added in a manner analogous to the brake input 138 of the first switching circuit 130 of FIG. 5A.) The tail signal input 302, the left and right turn signal inputs 304, 306 and the ground input 308 are preferably coupled to corresponding contacts (not shown) of the female coupling 34 (FIG. 1).

The second switching circuit 300 has six outputs corresponding to the six conductors of the first multiconductor cable 16 (FIG. 4). The tail signal input 302 and the ground input 308 are coupled directly to the tail signal conductor 116 and the ground conductor 120 of the first multiconductor cable 16.

The second switching circuit 300 includes three major components: a flasher 320, a first double pole-double throw magnetic relay switch 322 and a second triple pole-double throw toggle switch 324. The flasher 320, which is preferably a mechanical flasher, receives power from the tail light input 302 through the first and second switches 322, 324 and generates an intermittent flashing signal capable of serving as a caution signal to the left and right caution signal lights 24, 26 (FIG. 4). The second switch 324 acts as a truck/tractor selection switch. When the second switch 324 is in the state opposite that shown in FIG. 5B (that is, in a first switching state), the second switching circuit 300 is adapted for a truck plug configuration; when the second switch 324 is in the switching state shown in FIG. 5B (that is, in a second switching state), the second switching circuit 300 is adapted for a tractor plug configuration. In an especially preferred form, the second switch 324 includes a third switching state, intermediate between the truck and tractor states, in which the tail signal input 302, the left turn signal input 304 and the right turn signal input 306 are isolated from the remainder of the second switching circuit 300.

When the second switch 324 is in its tractor (second) state, the left and right turn signal inputs 304, 306 communicate along a second electrical path through switch components 330, 332 of the second switch 324 with the left and right caution/turn signal conductors 110, 118 of the first multiconductor cable 16 (FIG. 4). The flasher 320 and the first switch 322 are both isolated from the left and right caution/turn signal conductors 110, 118 and from the left and right caution lights 24, 26. Furthermore, when the second switch 324 is in its tractor (second) state, the relay coil 334 of the first switch 322 energized by a switch component 336 of the second switch 324, closing the first switch 322 and cutting off power to the flasher 320. The turn signal inputs (not shown) in a tractor plug configuration indicate both turn and caution, and these signals are conducted directly to the caution lights 24, 26 without modification by the second switching circuit 300 when the second switch is in the tractor (second) state.

On the other hand, the truck plug configuration does not supply a caution signal. The flasher 320 is interposed between the normally closed pole of a first switch component 340 of the first switch 322 and the armature of a second switch component 342 of the first switch 322. The armature of first switch component 340 of the first switch 322 communicates directly with the left and right caution/turn signal conductors 110, 118, either directly or through optional rectifiers 344, 344. When the first switch 322 is in a first switching state and the second switch 324 in a truck (first) switching state, the intermittent flashing signal generated by the flasher 320 communicates along a first electrical path through the first switch component 340 with the left and right caution lights 24, 26.

When an active turn signal (indicating braking or a turn) is received through the turn signal inputs 304, 306, the caution indication is interrupted. The turn signal signal passes through rectifiers 350, 352 and energizes the relay coil 334, thereby changing the first switch 322 to a second switching state. When the first switch 322 changes to its second switching state, the switching components 340, 342 cut the power to the flasher and isolate the flasher 150 from the left and right caution/turn signal conductors 110, 118. The rectifiers 350, 352 serve to isolate each of the left and right turn signal inputs 304, 306 from the signals conducted by the other. As a consequence, the caution indicators 24, 26 are dark when the second switch 324 is in the truck state and one or both of the left and right turn signals are active.

Since the turn signal inputs in the truck plug configuration also indicate braking, the turn signal inputs 304, 306 communicate through the switch components 330, 332 with the left and right brake signal conductors 112, 114 when the second switch 324 is in the truck (first) state. Thus, the second switching circuit 300 provides braking and turn indications through the tail lights 28, 30 only.

Figure 6:
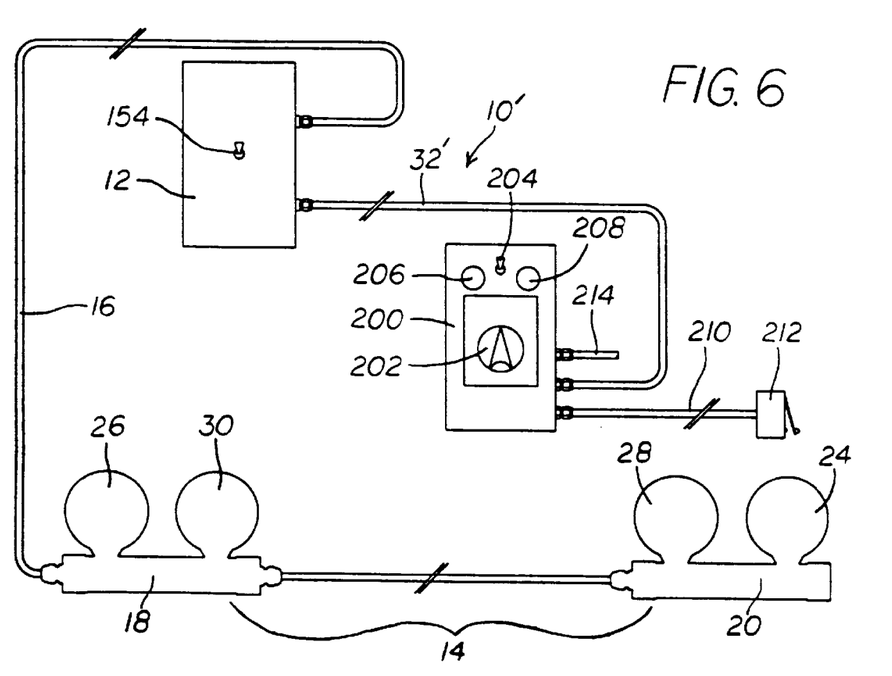
FIG. 6 is a schematic view of a second embodiment of the signalling apparatus of the present invention.

FIG. 6 shows another embodiment 10' of the signalling apparatus useful in connection with vehicles such as older farm tractors without turn, brake or caution indications. Analogous features of the embodiments 10 and 10' will be denoted by the same reference numeral. Like the embodiment 10 of FIG. 1, the embodiment 10' of FIG. 6 includes a switching box 12 and a support 14 including left and right frames 18, 20 supporting caution lights 24, 26 and running lights 28, 30. The switching box 12 is electrically coupled to the left frame 18 by means of a first multiconductor cable 16 and the left and right frames 18, 20 are electrically coupled by means of a second multiconductor cable 22. The left and right frames 18, 20; the caution lights 24, 26; and the running lights 28, 30 are identical in construction to those disclosed in the embodiment 10 of FIGS. 1–5, while the switching box 12 houses a switching circuit identical to the first switching circuit 130 of FIG. 5A. In the embodiment 10', the second switch 154 on the switching box 12 is preferably set in the tractor (second) state.

In addition to these components which the embodiment 10' shares with the embodiment 10, the embodiment 10' of FIG. 6 also includes a control box 200 coupled to the switching box by a third multiconductor cable 32'. The control box 200 includes a three-position selector switch 202 which permits the driver (not shown) to select either a caution indication, a right turn indication or a left turn indication. In addition, the control box 200 includes a caution signal switch 204 which permits the driver (not shown) to deactivate the caution indication independently of the right and left turn indications. Two lamps or telltales 206, 208 indicate when the right or left turn indication is selected. The control box 200 is coupled through a fourth multiconductor cable 210 to a limit switch 212 which is positioned between the brake pedal (not shown) and firewall (not shown) of the farm tractor or other vehicle (not shown) to provide a brake signal to the control box 200. A fifth multiconductor cable 214 conducts power from a power supply, such as a battery (not shown) of the farm tractor or other vehicle, to the control box 200.

Figure 7:
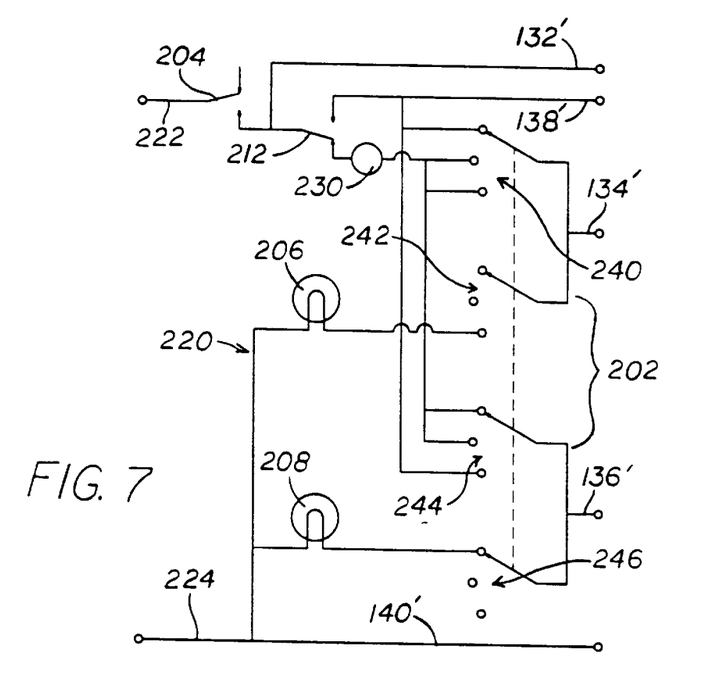
FIG. 7 is a schematic view of a control circuit for use in the embodiment of FIG. 6.

FIG. 7 is a schematic diagram of a control circuit 220 housed in the control box 200 for generating the caution, right turn or left turn indication selected by the driver (not shown). The control circuit 220 receives two inputs, a power supply input 222 and a ground input 224. The control circuit 220 has five outputs corresponding to the five inputs 132, 134, 136, 138, 140 of the switching circuit 130 of FIG. 5, namely a tail signal output 132', a left turn signal output 134', a right turn signal output 136', a brake signal output 138', and a ground output 140'. The ground input 224 is coupled directly to the ground output 140'. The two inputs 222, 224 are received through the fifth multiconductor cable 214 (FIG. 6), while the five outputs communicate with the switching box 12 through the third multiconductor cable 32' (FIG. 6).

Apart from the selector switch 202, the caution signal switch 204, the lamps 206 and 208, and the limit switch 212, the control circuit 220 includes an intermittent signal generator 230 which generates an intermittent signal used to flash the caution lights 24, 26 to provide the caution and turn indications. Preferably, the intermittent signal generator 230 is a mechanical flasher such as that shown in U.S. Pat. No. 3,611,288 to Little et al., the disclosure of which is incorporated by reference.

The caution signal switch 204, which is preferably a single pole toggle switch, is positioned between the intermittent signal generator 230 and the power supply input 222 so that the intermittent signal generator 230 is isolated from the power supply input 222 when the caution signal switch 204 is in an open state. The caution signal switch 204 permits the driver (not shown) to deactivate the caution indication when the farm tractor or other vehicle (not shown) is operated above a minimum speed. The common terminal of the limit switch 212 and the tail signal output 132' are each coupled to the normally open terminal of the caution signal switch 204, so that the tail signal output 132' is energized whenever the caution signal switch 204 is closed. The intermittent signal generator 230 is coupled to the normally closed terminal of the limit switch 212.

The selector switch 202 includes two switch components 240, 242 having common terminals coupled to the left turn signal output 134' and two switch components 244, 246 having common terminals coupled to the right turn signal output 136'. The center and left contacts of the switch component 240, and the center and right contacts of the switch component 244, are coupled to the output of the intermittent signal generator 230. Thus, the switch component 240 conducts the intermittent signal from the intermittent signal generator 230 to the left turn signal output 134' when the selector switch 202 is in either a first (left turn) or third (caution) switching state, while the switch component 242 conducts the intermittent signal from the intermittent signal generator 230 to the right turn signal output 136' when the selector switch is in either a second right (right turn) or the third (caution) state. In this way, the intermittent signal generator 230 and the selector switch 202 generate left turn, right turn and caution indications.

The switch components 242, 246 control the lamps 206, 208 which indicate that a left or right turn indication has been selected. When the selector switch 202 is moved to its first switching state and the left turn signal is conducted through the switch component 240, a portion of the left turn signal is conducted through the common terminal of the switch component 242 to the lamp 206. Similarly, when the selector switch 202 is moved to its second switching state and the right turn signal is conducted through the switch component 244, a portion of the right turn signal is conducted through the common terminal of the switch component 246 to the lamp 208.

When the brake pedal (not shown) is pressed, the limit switch 212 moves from the normally open to the normally closed position, thereby isolating the intermittent signal generator 230 from the power supply input 222 and interrupting the caution indication. At the same time, power is transferred to the normally open terminal of the limit switch 212, which is coupled to the brake signal output 138' to provide a brake signal to the running lights 28, 30.

Figure 8:
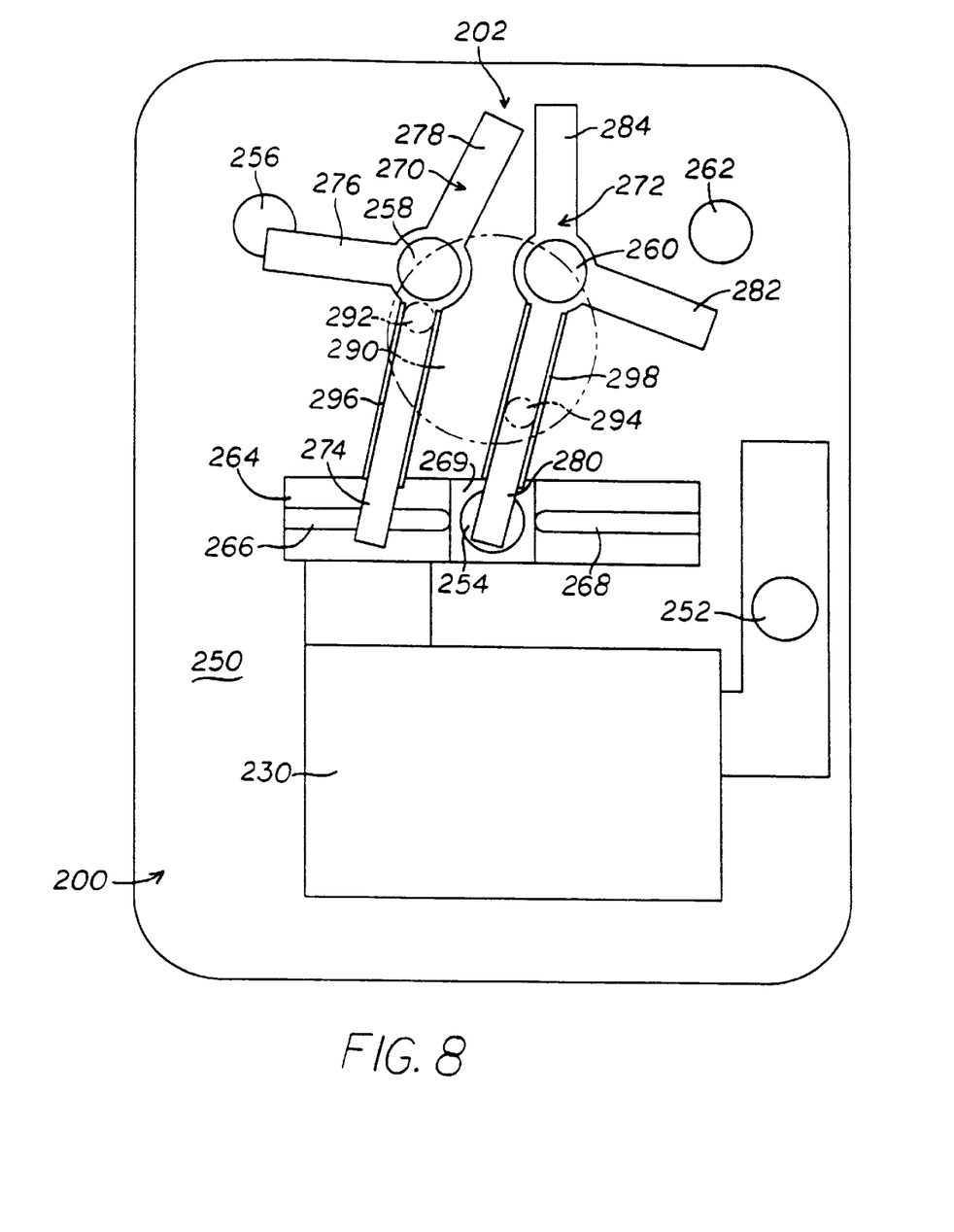
FIG. 8 is a schematic view showing a plan of an interior of a control box for use in the embodiment of FIG. 6.

FIG. 8 shows schematically the internal structure of the control box 200, including a preferred construction for the selector switch 202. The control box 200 includes a base 250 mounting six stud contacts 252, 254, 256, 258, 260, 262. Stud contact 252 transfers power from the normally closed terminal of the limit switch 212 to the intermittent signal generator 230. A metal strip 264 having two raised end portions 266, 268 separated by a depressed center portion 269 receives the output from the intermittent signal generator 230. The depressed center portion 269 of the metal strip 264 is secured to the base 250 by means of the stud contact 254, which is electrically isolated from the metal strip 264 by a nonconductive spacer (not shown).

Two switch contacts 270, 272 having arms 274, 276, 278, 280, 282, 284 pivot about the stud contacts 258, 260 such that end portions of the arms 274, 280 move between the raised portions 266, 268 of the metal strip 264 and the stud contact 254 when the switch contacts 270, 272 pivot about the stud contacts 258, 260. Stud contacts 256, 262 are positioned such that the arms 276, 282 move into and out of contact with the stud contacts 256, 262 as the switch contacts 270, 272 pivot about the stud contacts 258, 260. A knob 290 is pivotally coupled to the base 250 for pivoting the switch contacts 270, 272 to select between the first (left turn), second (right turn) or third (caution) switching states. The knob 290 includes a pair of cams 292, 294 which engage channels formed between pairs of walls 296, 298 on the arms 274, 280 of the switch contacts 270, 272 to pivot the switch contacts 270, 272 as the knob 290 is turned.

The stud contact 258 is coupled to the left turn signal output 134' (FIG. 7), the stud contact 260 is coupled to the right turn signal output 136' (FIG. 7), the stud contact 256 is coupled to the lamp 206 (FIG. 7), the stud contact 260 is coupled to the lamp 208 (FIG. 7), and the stud contact 254 is coupled to the normally open contact of the limit switch 212 (FIG. 7). When the selector switch 202 is in its third (caution) switching state, the arms 274, 280 of the switch contacts 270, 272 both contact the metal strip 264 and conduct the intermittent signal from the intermittent signal generator 230 through the stud contacts 258, 260 to the left and right turn signal outputs 134', 136' (FIG. 7). In this condition, neither of the switch contacts 270, 272 engage the stud contacts 256, 262, so that both of the lamps 206, 208 (FIG. 7) are dark.

When the selector switch 202 is turned to its first (left turn) switching state, the switch contacts 270, 272 each pivot (clockwise in FIG. 8). The arm 280 moves out of contact with the metal strip 264 and into contact with the stud contact 254, so that the switch contact 272, the stud contact 260 and the right turn signal output 136' (FIG. 7) are isolated from the intermittent signal generator 230. Meanwhile, the arm 276 pivots into contact with the stud contact 256, thereby coupling the lamp 206 (FIG. 7) with the intermittent signal from the intermittent signal generator 230 to indicate that a left turn signal has been selected. The response when the selector switch 202 is turned to its second (right turn) switching state is a mirror image of the response when the switch is turned to the first switching state, with the switch contact 270 isolated from the intermittent signal generator 230 and the stud contact 262 coupled to the intermittent signal to indicate that a right turn has been selected.

Various changes or modifications in the invention described may occur to those skilled in the art without departing from the true spirit or scope of the invention. For example, the caution and running indicators are not limited to lamps, but may include other signalling devices such as electrically-controlled light reflecting or scattering materials. The above description of preferred embodiments of the invention is intended to be illustrative and not limiting, and it is not intended that the invention be restricted thereto but that it be limited only by the true spirit and scope of the appended claims.

What is claimed is:

1. Signalling apparatus in combination with agricultural equipment to provide safety indicators visible behind said agricultural equipment, said agricultural equipment having a plug adapted to provide a ground signal, a tail signal, a left turn signal and a right turn signal, said left and right turn signals providing a flashing caution indication when no turn is being signalled, said apparatus comprising:

a support detachably mountable on said agricultural equipment;

caution indicators mounted by said support;

a module in electrical communication with said caution indicators; and an electrical coupling in electrical communication with the plug for communicating ground, tail, left turn and right turn signals to said module;

said module defining user-selectable first and second electrical paths leading to said caution indicators;

said module also including a flasher receiving power from said tail signal for generating a flashing signal, such that:

said second electrical path communicates the turn signals from the electrical coupling to said caution indicators; and said first electrical path electrically communicates said flashing signal to said caution indicators when all of the turn signals are inactive and isolates said flashing signal from said caution indicators when at least one of said left and right turn signals is active; and a switch through which said left and right turn signals are directed through said second electrical path to said caution indicators.

2. Signalling apparatus for retrofitting a vehicle to provide safety indicators visible behind the vehicle, said apparatus comprising:

a support detachably mountable on the vehicle;

caution indicators mounted by said support;

a module in electrical communication with said caution indicators; and an electrical coupling for receiving turn signals from the motor vehicle and communicating the turn signals to the module;

said module defining user-selectable first and second electrical paths leading to said caution indicators and a flasher interposed in said first electrical path for generating a flashing signal, such that:

said second electrical path communicates the turn signals from the electrical coupling to said caution indicators; and said first electrical path electrically communicates said flashing signal to said caution indicators when all of the turn signals are inactive and isolates said flashing signal from said caution indicators when at least one of the turn signals is active;

wherein said means for defining said first and second electrical paths include first and second switches, each of said first and second switches having first and second switching states such that said caution indicators are electrically coupled to said flasher when said first and second switches are each in said first switching state, and said caution indicators are isolated from said flasher when one of said first and second switches is in said second switching state;

wherein said first switch is a relay switch including a relay coil; first, second, third and fourth relay poles; a first relay armature normally in contact with said first relay pole and responsive to energizing of said relay coil for contact with said second relay pole; and a second relay armature normally in contact with said third relay pole and responsive to energizing of said relay coil for contact with said fourth relay pole;

said first and third relay poles electrically communicating with said flasher to receive said flashing signal; said second relay pole electrically communicating with said electrical coupling to receive a left turn signal of the turn signals; and said fourth relay pole electrically communicating with said electrical coupling to receive a right turn signal of the turn signals; and wherein said second switch is a toggle switch;

said second switch including first, second, third, fourth, fifth and sixth toggle poles; a first toggle contact in communication with said first toggle pole when said second switch is in its first switching state and in communication with said second toggle pole when said second switch is in its second switch state; a second toggle contact in communication with said third toggle pole when said second switch is in its first switching state and in communication with said fourth toggle pole when said second switch is in its second switch state; and a third toggle contact in communication with said fifth toggle pole when said second switch is in its first switching state and in communication with said sixth toggle pole when said second switch is in its second switch state;

said relay coil being interposed between said electrical coupling and said second toggle pole for receiving all of the turn signals; said third toggle pole electrically communicating with said left turn signal of the turn signals; said fourth toggle pole electrically communicating with said first relay armature; said fifth toggle pole electrically communicating with said right turn signal of the turn signals, said sixth toggle pole communicating with said second relay armature; said first toggle contact being grounded; said second toggle contact communicating with a left caution indicator of said caution indicators; and said third toggle contact communicating with a right caution indicator of said caution indicators.

3. Signalling apparatus for retrofitting a vehicle to provide safety indicators visible behind the vehicle, said apparatus comprising:

a support detachably mountable on the vehicle;

caution indicators mounted by said support;

a module in electrical communication with said caution indicators; and an electrical coupling for receiving turn signals from the motor vehicle and communicating the turn signals to the module;

said module defining user-selectable first and second electrical paths leading to said caution indicators and a flasher interposed in said first electrical path for generating a flashing signal, such that:

said second electrical path communicates the turn signals from the electrical coupling to said caution indicators; and said first electrical path electrically communicates said flashing signal to said caution indicators when all of the turn signals are inactive and isolates said flashing signal from said caution indicators when at least one of the turn signals is active;

wherein said means for defining said first and second electrical paths include first and second switches, each of said first and second switches having first and second switching states such that said caution indicators are electrically coupled to said flasher when said first and second switches are each in said first switching state, and said caution indicators are isolated from said flasher when one of said first and second switches is in said second switching state;

wherein said first switch is a relay switch including a grounded relay coil; first, second, third and fourth relay poles; a first relay armature normally in contact with said first relay pole and responsive to energizing of said relay coil for contact with said second relay pole; and a second relay contact normally in contact with said third relay pole and responsive to energizing of said relay coil for contact with said fourth relay pole;

said flasher being transposed between said first relay armature and said third relay pole; and wherein said second switch is a toggle switch;

said second switch including first, second, third, fourth, fifth and sixth toggle poles; a first toggle contact in communication with said first toggle pole when said second switch is in its first switching state and in communication with said second toggle pole when said second switch is in its second switch state; a second toggle contact in communication with said third toggle pole when said second switch is in its first switching state and in communication with said fourth toggle pole when said second switch is in its second switch state; and a third toggle contact in communication with said fifth toggle pole when said second switch is in its first switching state and in communication with said sixth toggle pole when said second switch is in its second switch state;

said first toggle contact electrically communicating with said electrical coupling for receiving a tail signal; said second toggle contact electrically communicating with said electrical coupling for receiving a left turn signal of the turn signals; said third toggle contact electrically communicating with said electrical coupling for receiving a right turn signal of the turn signals; said first toggle pole electrically communicating with said first relay pole; said second, third and fifth toggle poles electrically communicating with said grounded relay coil; said fourth toggle pole and said second relay armature electrically communicating with a left caution indicator of said caution indicators; and said sixth toggle pole and said second relay armature electrically communicating with a right caution indicator of said caution indicators.

4. Signalling apparatus for retrofitting a vehicle to provide safety indicators visible behind the vehicle, said apparatus comprising:

a support detachably mountable on the vehicle;

caution indicators mounted by said support;

a module in electrical communication with said caution indicators;

an electrical coupling for receiving turn signals from the motor vehicle and communicating the turn signals to the module;

said module defining user-selectable first and second electrical paths leading to said caution indicators and a flasher interposed in said first electrical path for generating a flashing signal, such that:

said second electrical path communicates the turn signals from the electrical coupling to said caution indicators;

said first electrical path electrically communicates said flashing signal to said caution indicators when all of the turn signals are inactive and isolates said flashing signal from said caution indicators when at least one of the turn signals is active; and a control box in electrical communication with said module through said electrical coupling, said control box including an intermittent signal generator and a turn signal control switch having first, second and third control states, wherein:

said intermittent signal generator electrically communicates with a left caution indicator of said caution indicators and is isolated from a right caution indicator of said caution indicators when said turn signal control switch is in the first control state;

said intermittent signal generator electrically communicates with said right caution indicator of said caution indicators and is isolated from said left caution indicator of said caution indicators when said turn signal control switch is in the second control state; and said intermittent signal generator electrically communicates with all of said caution indicators when said turn signal control switch is in said third control state.

5. The signalling apparatus as recited in claim 4 including a power supply for said intermittent signal generator and a caution light switch interposed between said power supply and said intermittent signal generator for de-energizing said intermittent signal generator.

6. The signalling apparatus as recited in claim 4 including a power supply for said intermittent signal generator and a limit switch for engagement with a brake pedal of the vehicle to generate a brake signal when a brake pedal of the motor vehicle is pressed, wherein said limit switch is adapted to interrupt said power supply to said intermittent signal generator when the brake pedal is pressed.

7. Signalling apparatus for retrofitting a truck or agricultural equipment to provide a caution indication, said apparatus comprising:

caution indicators;

an electrical coupling adapted to engage a plug from the truck or agricultural equipment, said electrical coupler including a ground signal contact adapted to receive a ground signal from the truck or agricultural equipment, a tail signal contact adapted to receive a tail signal from the truck or agricultural equipment, a left turn signal contact adapted to receive a left turn signal from the truck or agricultural equipment, and a right turn signal contact adapted to receive a right turn signal from the truck or agricultural equipment;

a flasher for receiving power from said tail signal contact and generating a flashing signal; and a manually-actuable switch having first and second switching states, whereby,
a) when said manually-actuable switch is in said first switching state and no power is received through said left and right turn signal contacts, said flasher communicates said flashing signal to said caution indicators;
b) when said manually-actuable switch is in said second switching state and power is received through one of said left and right turn signal contacts, said flasher is isolated from said caution indicators; and
c) when said manually-actuable switch is in said second switching state, said left and right turn signal contacts communicate with said caution indicators.

8. The signalling apparatus as recited in claim 7 including an electrically-actuable switch in communication with said left and right turn signal contacts when said manually-actuable switch is in its first switching state, whereby said flasher communicates with said caution indicators through said electrically-actuable switch when said second switch in in said first switching state and said electrically-actuable switch receives no power from said left and right turn signal contacts; and said flasher is isolated from said caution indicators when said electrically-actuable switch receives power from one of said left and right turn signal contacts.

9. The signalling apparatus as recited in claim 7 including braking indicators, said braking indicators communicating with said left and right turn signal contacts when said manually-actuable switch is in said first switching state.

10. The signalling apparatus as recited in claim 7 in combination with a truck, said electrical connector engaging a plug of an electrical system of said truck for receiving signals through said ground, tail, left turn signal and right turn signal contacts; wherein said electrical system of said truck supplies signals indicative of left turns and braking to said left turn signal contact; said electrical system of said truck supplies signals indicative of right turns and braking to said right turn signal contact; and said second switch is in said first switching state.

11. The signalling apparatus as recited in claim 7 in combination with agricultural equipment, said electrical connector engaging a plug of an electrical system of said agricultural equipment for receiving signals through said ground, tail, left turn signal and right turn signal contacts; wherein said electrical system of said agricultural equipment supplies signals indicative of left turns and caution to said left turn signal contact; said electrical system of said agricultural equipment supplies signals indicative of right turns and caution to said right turn signal contact; and said second switch is in said second switching state.

* * * * *